US006670578B2

(12) United States Patent
Hackel et al.

(10) Patent No.: US 6,670,578 B2
(45) Date of Patent: Dec. 30, 2003

(54) PRE-LOADING OF COMPONENTS DURING LASER PEENFORMING

(75) Inventors: Lloyd A. Hackel, Livermore, CA (US); John M. Halpin, Tracy, CA (US); Fritz B. Harris, Rocklin, CA (US)

(73) Assignee: The Regents of the University of California, Oakland, CA (US)

( * ) Notice: Subject to any disclaimer, the term of this patent is extended or adjusted under 35 U.S.C. 154(b) by 93 days.

(21) Appl. No.: 10/095,822

(22) Filed: Mar. 11, 2002

(65) Prior Publication Data

US 2002/0096504 A1 Jul. 25, 2002

Related U.S. Application Data

(63) Continuation-in-part of application No. 09/604,781, filed on Jun. 26, 2000, now Pat. No. 6,410,884.
(60) Provisional application No. 60/144,594, filed on Jul. 19, 1999.

(51) Int. Cl.[7] .............................................. B23K 26/00
(52) U.S. Cl. ................. 219/121.85; 219/121.6
(58) Field of Search ................. 219/121.6, 121.61, 219/121.85; 148/525, 565

(56) References Cited

U.S. PATENT DOCUMENTS

| | | | |
|---|---|---|---|
| 3,705,511 A | 12/1972 | Brandel et al. | |
| 4,937,421 A | 6/1990 | Ortiz, Jr. et al. | 219/121.68 |
| 5,492,447 A | 2/1996 | Mannava et al. | 415/200 |
| 5,522,706 A | 6/1996 | Mannava et al. | 416/215 |
| 5,525,429 A | 6/1996 | Mannava et al. | 428/610 |
| 5,531,370 A | 7/1996 | Rohrberg | |
| 5,531,570 A | 7/1996 | Mannava et al. | 416/241 R |
| 5,569,018 A | 10/1996 | Mannava et al. | 415/200 |
| 5,584,586 A | 12/1996 | Casarcia et al. | 384/625 |
| 5,584,662 A | 12/1996 | Mannava et al. | 416/241 R |
| 5,591,009 A | 1/1997 | Mannava et al. | 416/241 R |
| 5,620,307 A | 4/1997 | Mannava et al. | 416/241 R |
| 5,671,628 A | 9/1997 | Halila et al. | 72/53 |
| 5,674,328 A | 10/1997 | Mannava et al. | 148/525 |
| 5,674,329 A | 10/1997 | Mannava et al. | 148/525 |
| 5,675,892 A | 10/1997 | Mannava et al. | 29/889 |
| 5,730,811 A | 3/1998 | Azad et al. | 148/565 |
| 5,735,044 A | 4/1998 | Ferrigno et al. | 29/889 |
| 5,741,559 A | 4/1998 | Dulaney | 427/554 |

(List continued on next page.)

FOREIGN PATENT DOCUMENTS

WO    WO 01/05549 A2    1/2001

*Primary Examiner*—Geoffrey S. Evans
(74) *Attorney, Agent, or Firm*—John P. Wooldridge; Alan H. Thompson

(57) ABSTRACT

A method and apparatus are provided for forming shapes and contours in metal sections by prestressing a workpiece and generating laser induced compressive stress on the surface of the metal workpiece. The step of prestressing the workpiece is carried out with a jig. The laser process can generate deep compressive stresses to shape even thick components without inducing unwanted tensile stress at the metal surface. The precision of the laser-induced stress enables exact prediction and subsequent contouring of parts.

32 Claims, 1 Drawing Sheet

U.S. PATENT DOCUMENTS

| | | | |
|---|---|---|---|
| 5,742,028 A | 4/1998 | Mannava et al. | 219/121.82 |
| 5,744,781 A | 4/1998 | Yeaton | 219/121.84 |
| 5,756,965 A | 5/1998 | Mannava | 219/121.85 |
| 5,846,054 A | 12/1998 | Mannava et al. | 416/219 R |
| 5,846,057 A | 12/1998 | Ferrigno et al. | 416/241 R |
| 5,911,890 A | 6/1999 | Dulaney et al. | 219/121.85 |
| 5,911,891 A | 6/1999 | Dulaney et al. | 219/121.85 |
| 5,932,120 A | 8/1999 | Mannava et al. | 219/121.85 |
| 5,935,464 A | 8/1999 | Dulaney et al. | 219/121.65 |
| 5,948,293 A | 9/1999 | Somers et al. | 219/121.85 |
| 5,951,790 A | 9/1999 | Mannava et al. | 148/510 |
| 5,980,101 A | 11/1999 | Unternahrer et al. | 374/32 |
| 5,987,042 A | 11/1999 | Staver et al. | 372/30 |
| 5,987,991 A | 11/1999 | Trantow et al. | 73/624 |
| 5,988,982 A | 11/1999 | Clauer | 416/241 R |
| 6,002,102 A | 12/1999 | Dulaney et al. | 219/121.85 |
| 6,002,706 A | 12/1999 | Staver et al. | 372/108 |
| 6,005,219 A | 12/1999 | Rockstroh et al. | 219/121.85 |
| 6,021,154 A | 2/2000 | Unternahrer | 372/108 |
| 6,049,058 A | 4/2000 | Dulaney et al. | 219/121.84 |
| 6,057,003 A | 5/2000 | Dulaney et al. | 427/457 |
| 6,064,035 A | 5/2000 | Toller et al. | 219/121.86 |
| 6,075,593 A | 6/2000 | Trantow et al. | 356/318 |
| 6,078,022 A | 6/2000 | Dulaney et al. | 219/121.85 |
| 6,127,649 A | 10/2000 | Toller et al. | 219/121.86 |
| 6,130,400 A | 10/2000 | Rockstroh | 219/121.6 |
| 6,144,012 A | 11/2000 | Dulaney et al. | 219/121.85 |
| 6,155,789 A | 12/2000 | Mannava | 416/241 R |
| 6,183,882 B1 * | 2/2001 | Mannava et al. | 148/565 |
| 2002/0096504 A1 | 7/2002 | Hackel et al. | |

* cited by examiner

PRE-LOADING OF COMPONENTS DURING LASER PEENFORMING

This application is a continuation-in-part of U.S. patent application Ser. No. 09/604,781, titled "Contour Forming Of Metals By Means of Laser Peening," filed Jun. 26, 2000 now U.S. Pat. No. 6,410,884, incorporated herein by reference, which claims priority based upon provisional application Ser. No. 60/144,594, filed Jul. 19, 1999.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to laser shock processing, and more specifically, it relates to techniques for contouring metal by laser peening.

2. Description of Related Art

Using high power lasers to improve material properties is one of the most important industrial applications of lasers. Lasers can transmit controllable beams of high-energy radiation for metalworking. Primarily, the laser can generate a high power density that is localized and controllable over a small area. This allows for cost effective and efficient energy utilization, minimizes distortions in surrounding areas, and simplifies material handling. Since the laser pulse involves the application of high power in short time intervals, the process is adaptable to high-speed manufacturing. The fact that the beam can be controlled allows parts having complex shapes to be processed. Also accuracy, consistency, and repeatability are inherent to the system.

Improving the strength of metals by cold working undoubtedly was discovered early in civilization, as ancient man hammered out his weapons and tools. Since the 1950s, shot peening has been used as a means to improve the fatigue properties of metals. Another method of shock processing involves the use of high explosive materials in contact with the metal surface.

The use of high intensity laser outputs for the generation of mechanical shock waves to treat the surfaces of metals has been well known since the 1970s. The laser shock process can be used to generate compressive stresses in the metal surfaces, adding strength and resistance to corrosive failure.

Lasers with pulse outputs of 10 to 100 J and pulse durations of 10 to 100 ns are useful for generating inertially confined plasmas on the surfaces of metals. These plasmas create pressures in the range of 10,000 to 100,000 atmospheres and the resulting shock pressure can exceed the elastic limit of the metal and thus compressively stress a surface layer as deep or deeper than 1 mm in the metals. Lasers are now becoming available with average power outputs meaningful for use of the technique at a rate appropriate for industrial production.

In the process of laser shock processing, a metal surface to be treated is painted or otherwise made "black" that is, highly absorbing of the laser light. The black layer both acts as an absorber of the laser energy and protects the surface of the part from laser ablation and from melting due to the high temperature of the plasma. A thin layer of water, typically 1 to 2 mm, is flowed over this black surface. The water acts to inertially confine or, as it is called, tamp the plasma generated as the laser energy is absorbed in the short time pulse duration, typically 30 ns. Other suitable materials that act as a tamper are also possible. A limitation to the usefulness of the process is the ability to deliver the laser energy to the metal surface in a spatially uniform beam. If not uniform, the highest intensity area of the light can cause a breakdown in the water which blocks delivery of meaningful energy to the painted metal surface. A conventional technique to deliver the laser light to the surface is to use a simple lens to condense the laser output to a power density of roughly 100 J to 200 J per square centimeter. This condensing technique has the limitation that a true "image" of the laser near-field intensity profile is not obtained at the surface. Rather a field intensity representing something between the near and far fields is generated. Diffraction of the laser beam as it is focused down onto the surface results in very strong spatial modulation and hot spots.

Any phase aberrations generated within the beam, especially those associated with operation of the laser for high average power, can propagate to generate higher intensity areas within the beam. These high peak intensity regions cause breakdown in the water layer, preventing efficient delivery of the laser energy to the surface to be treated. Another potential cause of breakdown in the tamping material is the generation of non-linear effects such as optical breakdown and stimulated scattering. In a normal generation of a 10 ns to 100 ns pulse within a laser, the output slowly builds over a time period exceeding several pulsewidths. This slow, weak intensity helps to seed the non-linear processes that require buildup times of 10s of nanoseconds. In conventional techniques, the pulse output of the laser is "sliced" by an external means such as a fast rising electro-optical switch or by an exploding foil. These techniques can be expensive and can limit reliability.

A controlled application of compressive stress applied to one side of a metal surface will cause that surface to expand in a predictable manner and can thus curve the metal in a highly controllable fashion. Upon curving, the convex surface is left with a residual compressive stress, which is highly desirable for fatigue and corrosion resistance of the part in operation. The technique of inducing this compressive stress by means of shot peening is well known and in general use. However, shot peening is limited in the depth of intense compressive stress that can be induced without generating significant and undesirable cold working of the surface layer. Due to the required spherical shape of shot used for peening, the process imparts a non-uniform pressure versus time profile to the metal during each individual impact of the shot. Pressure is initiated at the first contact point of the sphere and then spreads across the impact area as the metals deform and the entire cross-section of the shot contacts the metal. This non-uniform application of pressure results in a local extrusion of the metal, a flow of metal from the center to the outer area of the impact zone. Consequently, more cold work is done on the metal as material extrudes due to the wedge of pressure created by the impact of the shot The forming of metals into complex shapes is required for many applications. There are a number of processes that use heat and yielding to stretch and form metal into required shapes. Especially in the aerospace industry, the application of heat and yielding strain can be detrimental to the mechanical properties of the metal and hence undesirable for many metals such as aluminum and titanium. Nonetheless, the aerospace industry needs to form complex shaped parts and achieve the forming with a high degree of precision. Currently there are problems attaining the desired curvature without yielding in components of greater than half-inch thickness. There is also in general a lack of precise control in the parts forming such that attachment holes and the trimming to exact shape cannot be done until the formed part is brought to the component frame for final installation. Precise forming, with large curvature, especially in thick section materials, would be highly desirable.

The laser peening process as described in the parent application, can be used to shape components by creating residual compressive stress over a given surface area and allowing this stress to create strain resulting in a convex surface curvature. By systematically applying this process to both top and bottom surfaces of a piece of metal, the desired curvature for the entire piece of metal, including complex shapes such as saddle shapes can be achieved.

It would be desirable to provide a technique that achieves a greater curvature than that achieved with laser forming.

SUMMARY OF THE INVENTION

It is an object of the present invention to provide a means to achieve an enhanced curvature in a part by pre-loading the component in a local area with a bending moment that results in strain that deflects the part achieving a stress that is near to but below the yielding limit.

The parent application discussed the concept of forming complex shapes in metals by means of laser shot peening. That application teaches that deformation in any desired direction can be enhanced by mechanically inducing a bending moment (although below the yield limit of the metal) in that direction during application of the laser peenforming pulses. This continuation-in-part provides a more detailed description of this enhancement. The advantage of the applied bending moment can be very significant, adding up to 50% improvement with respect to the resulting net deformation and/or curvature. A simple means to induce a bending moment is to employ a fixture consisting of a strongback on the eventual concave side and oriented along the desired arc with grips to attach to the metal on the convex side. The strongback is drilled and threaded in one or more places to accept large bolts that can be screwed through the strongback and to push against a pad in contact with the metal to be formed. Computer controlled hydraulic actuators can be used in place of screws and be more effective in rapidly and exactly applying the desired loading. The pad is contoured to spread the load along the desired arc. Loading is achieved by turning the bolt with a large wrench until achieving a deformation equivalent to the desired percentage of a yielding deformation. With the component thus loaded, laser peening is applied to the convex side along the direction of the deformed arc. As the laser peening is applied to the surface, the induced stress begins to relax the resistance to the applied load. To obtain maximum deformation the bolt is adjusted to keep the loading constant. In the case of the hydraulic load, the computer control maintains a constant load. The laser peening pattern density and the laser intensity used depends on the material properties and desired residual curvature of the material being contoured. For complex shapes, the fixture and peening process are used along each desired arc of curvature.

DETAILED DESCRIPTION OF THE INVENTION

Figure 1:
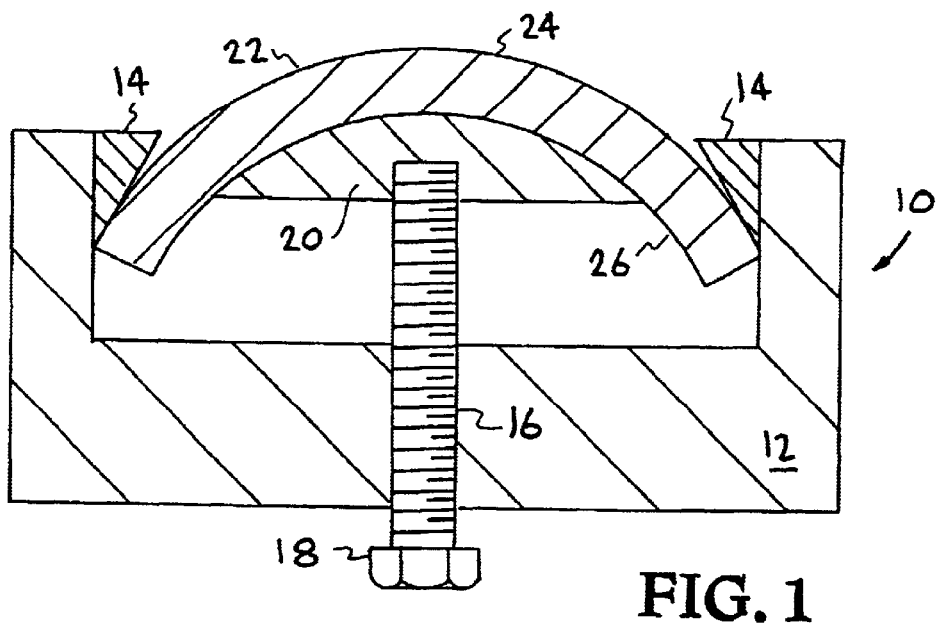
FIG. 1 shows a forming jig with a bolt-actuated spreader pad.

Techniques for laser peening are disclosed in co-pending U.S. Pat. No. 6,198,069, titled "Laser Beam Temporal And Spatial Tailoring For Laser Shock Processing", incorporated herein by reference. Laser technology usable in the present invention is described in U.S. Pat. No. 5,285,310 titled "High Power Regenerative Laser Amplifier," incorporated herein by reference, and U.S. Pat. No. 5,239,408 titled "High Power, High Beam Quality Regenerative Amplifier," also incorporated herein by reference. Embodiments of laser systems usable in the present invention are described in U.S. Pat. No. 5,689,363 titled "Long Pulse Width, Narrow-Bandwidth Solid State Laser" incorporated herein by reference.

The present invention is a technique used to apply a bending moment load resulting in a deflection to components to achieve approximately 80% yield stress prior to application of a laser peening process. The bending moment is observed to result in a greater curvature than would otherwise be attained in the component after the processing when the bending moment load is removed. This bending moment is applied by means of a fixture, called a forming jig and consisting of a strongback placed on the eventual concave side and oriented along the desired arc with grips to attach to the metal on the convex side. In one embodiment, the strongback is drilled and threaded in one or more places to accept large bolts that can be screwed through the strongback and load against a pad placed in contact with the metal to be formed. The pad is contoured to spread the load along the desired arc. Loading is achieved by turning in the bolt with appropriate torque until achieving a deformation equivalent to approximately 80% of a yielding deformation. With the component thus loaded, laser peening is applied to the convex side along the direction of the deformed arc. As peening is applied and the metal begins to take shape, the bolt load is adjusted to keep the load near the 80% yield.

The laser peening pattern density and intensity and fluence used depends on the material properties and desired residual curvature of the material being contoured. For complex shapes, the fixture and peening process are used along each desired arc of curvature. The applied bending moment uniformly loads the component as opposed to being applied as a simple point source load. Uniform loading is achieved by employing a "spreader pad" at or near the desired curvature and deployed under the end of the bolt that is in contact with the metal. Uniform loading can further be achieved by employing multiple bolts with spreader pads deployed over the arc to be formed. The preforming can be done using a single forming jig that is moved from arc section to section or by using multiple jigs that pre-deflect the overall curvature to be achieved. Because of the large loading encountered between the bolt and the spreader pad, it is important to use materials that allow the bolt to freely turn without creating torque onto the spreader pad and result in marring of the component surface. Suitable materials for the bolt would be a 1.5" diameter #5 cadmium plated steel bolt and the spreader pad would be a Teflon plastic pad with 1.4" depth by 1.6" diameter locator depression for contact with the bolt.

Use of the forming jig results in greater curvature for a given application of laser peening and thus allows for formation of sharper radii of curvature components than would otherwise be possible. Adjusting the bolt loading adds to this effect.

FIG. 1 shows a forming jig with a bolt-controlled spreader pad. The jig 10 is comprised of a strongback 12 that has grips 14 and a threaded hole 16 for bolt 18. A spreader pad 20 is in contact with the distal end of the bolt 18. As the bolt 18 is turned clockwise, the spreader pad is forced to move in the same direction of movement as the bolt 18. In operation, a component 22 to be shaped is inserted into the forming jig 10 between the spreader pad 20 and the grips 12. As the bolt is screwed into the strongback, the component 22 to be shaped is forced by the spreader pad against the grips 12. Force is applied by the spreader pad 20 against the component until the component 22 achieves a desired curvature. Laser peening, as described, e.g., in the parent application, is applied to the convex side 24 of the component 22. As discussed in the parent application, the step of generating laser induced compressive stress may include covering the workpiece with a layer of material that absorbs laser light. In some cases, the material may be a plastic, e.g., a polyvinyl acetate plastic or a polyvinyl chloride plastic. Another material found useful as the laser light absorbing material is a metal foil with an adhesive backing. After this initial stage of laser peening has been applied to the convex side, further laser peening may be applied to the concave side 26 if desired.

Figure 2:
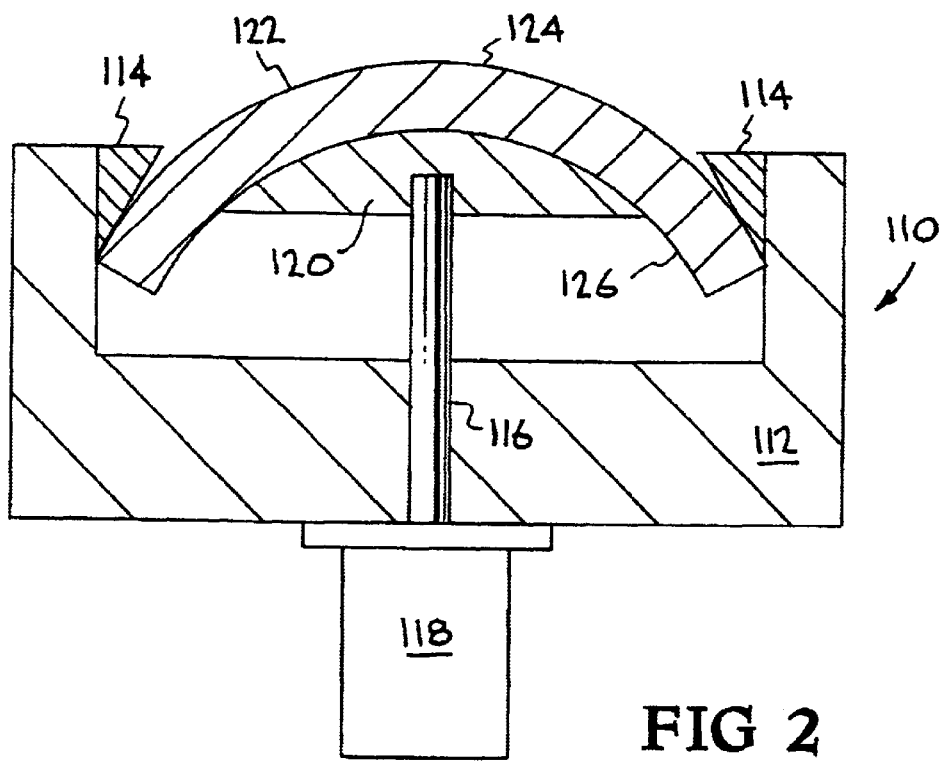
FIG. 2 shows a forming jig with hydraulic control.

FIG. 2 shows a forming jig with a hydraulically-controlled spreader pad. The jig 110 is comprised of a strongback 112 that has grips 114 and a through hole 116 for a hydraulic piston 118. A spreader pad 120 is in contact with the distal end of the hydraulic piston 118. As the hydraulic piston 118 is actuated, the spreader pad is forced to move in the same direction of movement as the hydraulic piston 118. In operation, the hydraulic piston 118 is positioned to a minimum position such that the spreader pad is also at a minimum position. A component 122 to be shaped is inserted into the forming jig 110 between the spreader pad 120 and the grips 114. As the hydraulic piston is actuated, the component 122 to be shaped is forced by the spreader pad against the grips 114. Force is applied by the spreader pad 120 against the component until the component 122 achieves a desired curvature. Laser peening is applied to the convex side 124 of the component 122. Further laser peening may be applied to the concave side 126 if desired. Peening on the concave side will selectively flatten the curvature in the area peened.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A method for forming shapes and contours in metal, comprising:
   providing a metal workpiece to be formed;
   prestressing said metal workpiece; and
   generating laser induced compressive stress on a surface of said metal workpiece until a desired shape is formed therein.

2. The method of claim 1, wherein the step of prestressing said metal workpiece includes prestressing said metal workpiece with a jig.

3. The method of claim 2, wherein said jig comprises:
   a strongback;
   a spreader pad;
   means for forcing said spreader pad away from said strongback;
   means for gripping a portion of a component to be shaped such that when said spreader pad is forced away from said strongback, a bending moment will be exerted on said component to be shaped.

4. The method of claim 2, wherein said jig comprises:
   a base having a hole;
   means for gripping at a fixed distance from said base, a component to be shaped;
   a spreader pad; and
   means for forcing said spreader pad away from said base to exert a bending force on said component to be shaped.

5. The method of claim 1, wherein the step of generating laser induced compressive stress further comprises selecting at least one of laser energy, laser pulse footprint, laser pulse overlap, pulse duration and number of pulses applied to each area of said metal workpiece to control intensity and depth of compressive stress applied to said each local area of said metal workpiece.

6. The method of claim 2, wherein the step of selecting the laser energy comprises selecting a laser energy within a range of 10 J to 100 J per pulse.

7. The method of claim 5, wherein the step of selecting the pulse duration comprises selecting a pulse duration within a range of 10 ns to 30 ns.

8. The method of claim 7, wherein said pulse comprises a rising edge of less than 1 ns.

9. The method of claim 1, wherein the step of generating laser induced compressive stress comprises covering said workpiece with a layer of material that absorbs laser light.

10. The method of claim 5, further comprising imaging the near field of said laser to a spot size on said metal workpiece.

11. The method of claim 5, further comprising imaging the near field of said laser to a spot size to provide an energy fluence of between 60 and 200 $J/cm^2$ at the surface of said metal workpiece.

12. The method of claim 9, wherein said material comprises plastic.

13. The method of claim 12, wherein said plastic is selected from a group consisting of polyvinyl acetate plastic and polyvinyl chloride plastic.

14. The method of claim 13, wherein said plastic is approximately 200 $\mu$m thick.

15. The method of claim 9, wherein said material comprises a metal foil with an adhesive backing.

16. The method of claim 9, wherein the step of generating laser induced compressive stress further comprises flowing a thin layer of water over said material, wherein said thin layer of water acts as a tamping layer.

17. The method of claim 16, wherein said thin layer of water is approximately 1 mm thick.

18. The method of claim 1 wherein the step of generating laser induced compressive stress comprises sequentially applying laser pulses in a raster scan fashion on a surface of said metal workpiece, wherein compressive stress will be induced over said surface, wherein said compressive stress will in turn generate a strain of the top layer of said metal workpiece and produce a curvature in said metal workpiece.

19. The method of claim 1, wherein the step of generating laser induced compressive stress comprises selectively applying compressive stress to the concave side of a metal workpiece having an unwanted curvature to systematically straighten a part.

20. The method of claim 1, further comprising enhancing the amount of a bend produced in said metal workpiece by utilizing a mechanical bending load during the peening process.

21. The method of claim 20, wherein said bending load is held constant during the step of generating laser induced compressive stress on a surface of said metal workpiece.

22. The method of claim 1, further comprising controlling peenforming in two dimensions by selectively applying pulses to a two-dimensional area and controlling the number of pulses applied at each spot and the intensity of each pulse.

23. The method of claim 1, further comprising controlling peenforming in two dimensions by selectively applying pulses to a two-dimensional area, controlling the number of pulses applied at each spot and the intensity of each pulse, by placing compensating pulses on the surface that becomes concave and by taking advantage of the increasing mechanical moment of inertia generated within the part as a component changes to a curved shape.

24. The method of claim 1, wherein the step of generating laser induced compressive stress includes generating laser induced compressive stress on a surface of said metal workpiece until a desired shape is formed therein without inducing unwanted tensile stress at the surface of said metal workpiece.

25. An apparatus for forming shapes and contours in metal, comprising:
   means for prestressing a metal workpiece; and
   means for generating laser induced compressive stress on a surface of said metal workpiece until a desired shape is formed therein.

26. The apparatus of claim 25, wherein said means for prestressing a metal workpiece comprises a jig.

27. The apparatus of claim 26, wherein said jig comprises:
   a strongback;
   a spreader pad;
   means for forcing said spreader pad away from said strongback; and
   means for gripping a portion of a component to be shaped such that when said spreader pad is forced away from said strongback, a bending load will be exerted on said component to be shaped.

28. The apparatus of claim 26, wherein said jig comprises:
   a base having a hole;
   means for gripping at a fixed distance from said base, a component to be shaped;
   a spreader pad; and
   means for forcing said spreader pad away from said base to exert a bending force on said component to be shaped.

29. The apparatus of claim 25, wherein said means for generating laser induced compressive stress comprise a laser system that is capable of producing a series of laser pulses, wherein each laser pulse of said series of laser pulses has an energy within a range of 10 J to 100 J per pulse, wherein said each laser pulse has a pulse duration within a range of 10 ns to 20 ns and a rising edge that is less than 1 ns.

30. The apparatus of claim 29, wherein said means for generating laser induced compressive stress further comprises means for imaging the near field of said each laser pulse to a spot size on said layer of material, wherein said series of laser pulses will generate compressive stress on the surface of said metal workpiece until a desired shape is formed therein without inducing unwanted tensile stress at the surface of said metal workpiece.

31. The apparatus of claim 30, wherein said means for imaging the near field of said each laser pulse images said each laser pulse to a spot size to provide an energy fluence of between 60 and 200 J/cm$^2$ at the surface of said metal workpiece.

32. The apparatus of claim 30, further comprising means for sequentially applying laser pulses in a raster scan fashion on the surface of said metal workpiece, wherein compressive stress will be induced over the surface illuminated, wherein said compressive stress will in turn generate a strain of the top layer of said metal workpiece and produce a curvature in said metal workpiece.

* * * * *